US009172765B2

(12) United States Patent  (10) Patent No.: US 9,172,765 B2
Beisel  (45) Date of Patent: Oct. 27, 2015

(54) POLLING-BASED SECURE NETWORK MESSAGE NOTIFICATION SYSTEM AND METHOD WITH PERFORMANCE ENHANCING FEATURES

(75) Inventor: Philipp W Beisel, San Jose, CA (US)

(73) Assignee: Desktop ALert, Inc., Chatham, NJ (US)

( * ) Notice: Subject to any disclaimer, the term of this patent is extended or adjusted under 35 U.S.C. 154(b) by 621 days.

(21) Appl. No.: 13/067,878

(22) Filed: Jul. 1, 2011

(65) Prior Publication Data

US 2012/0036208 A1  Feb. 9, 2012

Related U.S. Application Data

(60) Provisional application No. 61/398,796, filed on Jul. 1, 2010.

(51) Int. Cl.
| | |
|---|---|
| G06F 15/16 | (2006.01) |
| H04L 29/08 | (2006.01) |
| H04L 12/18 | (2006.01) |
| H04L 12/58 | (2006.01) |

(52) U.S. Cl.
CPC ............ *H04L 67/26* (2013.01); *H04L 12/1895* (2013.01); *H04L 12/18* (2013.01); *H04L 12/1863* (2013.01); *H04L 51/24* (2013.01)

(58) Field of Classification Search
CPC . H04L 12/587; H04L 29/12924; H04L 51/24; H04L 29/06; H04L 29/08045; H04L 29/12018; H04L 61/10; H04L 61/6063; H04L 63/0442; H04L 63/08; H04L 63/0823; H04L 63/168; H04L 12/18; H04L 12/1895; H04L 67/2842; H04L 67/306; G06Q 30/00
USPC .................................................. 709/206, 224
See application file for complete search history.

(56) References Cited

U.S. PATENT DOCUMENTS

| | | | | |
|---|---|---|---|---|
| 6,701,353 | B1 * | 3/2004 | Block | 709/219 |
| 6,871,214 | B2 * | 3/2005 | Parsons et al. | 709/206 |
| 7,496,628 | B2 * | 2/2009 | Arnold et al. | 709/206 |
| 7,975,025 | B1 * | 7/2011 | Szabo et al. | 709/218 |
| 8,359,574 | B1 * | 1/2013 | Bannur et al. | 717/120 |
| 2002/0087643 | A1 * | 7/2002 | Parsons et al. | 709/206 |
| 2003/0028587 | A1 * | 2/2003 | Driscoll et al. | 709/203 |
| 2005/0181767 | A1 * | 8/2005 | Boland et al. | 455/412.2 |
| 2005/0246424 | A1 * | 11/2005 | Panec et al. | 709/207 |
| 2006/0069734 | A1 * | 3/2006 | Gersh et al. | 709/207 |
| 2007/0136464 | A1 * | 6/2007 | Gorty et al. | 709/224 |
| 2007/0198677 | A1 * | 8/2007 | Ozhan et al. | 709/223 |
| 2007/0202884 | A1 * | 8/2007 | Nykanen et al. | 455/455 |
| 2010/0049815 | A1 * | 2/2010 | Vanecek et al. | 709/206 |
| 2010/0161362 | A1 * | 6/2010 | Shapira et al. | 705/7 |
| 2010/0299728 | A1 * | 11/2010 | Haff et al. | 726/5 |
| 2011/0209211 | A1 * | 8/2011 | Kuindersma et al. | 726/12 |
| 2012/0036208 | A1 * | 2/2012 | Beisel | 709/206 |
| 2012/0197982 | A1 * | 8/2012 | Waher | 709/203 |
| 2013/0110953 | A1 * | 5/2013 | Sutedja et al. | 709/206 |
| 2013/0326019 | A1 * | 12/2013 | Haff et al. | 709/217 |

* cited by examiner

*Primary Examiner* — Richard G Keehn
*Assistant Examiner* — Mohammed Ahmed
(74) *Attorney, Agent, or Firm* — Andrew C. Aitken (57) ABSTRACT

A method for the dissemination of an alert message to a plurality of personal computers using a network communications protocol from a server is disclosed that includes a first step wherein the client contacts the central server and requests the value of said alert ID number in said memory, a second step wherein said server transmits said value to said client, a third step wherein said client compares a stored value at the client with the value of the transmitted alert ID number, and if said transmitted value exceeds said stored value, a fourth step wherein said client transmits a second message to said server and requests for the server to transmit all unread alert messages in a GetUnreadAlerts SOAP request from said server that are specific to said client.

13 Claims, 12 Drawing Sheets

FIG. 3: Before: Database transactions/second

FIG. 4: After: Test Client throughput

FIG. 5: After: Database transactions/second

FIG. 6: After: Database Activity (reads/writes)

```
<?xml version="1.0" encoding="utf-8" ?>
- <soap:Envelope xmlns:soap="http://schemas.xmlsoap.org/soap/envelope/"
    xmlns:xsi="http://www.w3.org/2001/XMLSchema-instance" xmlns:xsd="http://www.w3.org/2001/XMLSchema"
    xmlns:wsa="http://schemas.xmlsoap.org/ws/2004/08/addressing" xmlns:wsse="http://docs.oasis-
    open.org/wss/2004/01/oasis-200401-wss-wssecurity-secext-1.0.xsd" xmlns:wsu="http://docs.oasis-
    open.org/wss/2004/01/oasis-200401-wss-wssecurity-utility-1.0.xsd">
  - <soap:Header>
      <wsa:Action>http://service.desktopalert.net/AlertService.asmx/GetUnreadAlerts</wsa:Action>
      <wsa:MessageID>urn:uuid:2cb954a2-e83a-42ca-98f4-01fedca8b7d2</wsa:MessageID>
    - <wsa:ReplyTo>
        <wsa:Address>http://schemas.xmlsoap.org/ws/2004/08/addressing/role/anonymous</wsa:Address>
      </wsa:ReplyTo>
      <wsa:To>http://192.168.0.22/Web/AlertService.asmx</wsa:To>
    - <wsse:Security soap:mustUnderstand="1">
      - <wsu:Timestamp wsu:Id="Timestamp-d91ed39b-7cfc-4859-a220-7940109fc301">
          <wsu:Created>2009-09-19T22:26:38Z</wsu:Created>
          <wsu:Expires>2009-09-19T22:31:38Z</wsu:Expires>
        </wsu:Timestamp>
      - <wsse:UsernameToken xmlns:wsu="http://docs.oasis-open.org/wss/2004/01/oasis-200401-wss-wssecurity-
          utility-1.0.xsd" wsu:Id="SecurityToken-09f8aebb-5c0b-4c35-8ead-5c62b36abbc8">
          <wsse:Username>pbeisel</wsse:Username>
          <wsse:Password Type="http://docs.oasis-open.org/wss/2004/01/oasis-200401-wss-username-token-
            profile-1.0#PasswordDigest">AzQ217nCcOK+md4+R6HXiARzSlU=</wsse:Password>
          <wsse:Nonce>W/wLHhWhDcPPyKWBVX/zew==</wsse:Nonce>
          <wsu:Created>2009-09-19T22:26:38Z</wsu:Created>
        </wsse:UsernameToken>
      </wsse:Security>
    </soap:Header>
  - <soap:Body>
      <GetUnreadAlerts xmlns="http://service.desktopalert.net/AlertService.asmx" />
    </soap:Body>
  </soap:Envelope>
```

FIG. 10 Database Use Before (reads/writes)

FIG. 11 Database Use After (reads/writes)

FIG. 12. SQL Statement use, before

FIG. 13. SQL Statement use, after

FIG. 14

POLLING-BASED SECURE NETWORK MESSAGE NOTIFICATION SYSTEM AND METHOD WITH PERFORMANCE ENHANCING FEATURES

This application claims the benefit of U.S. Patent Application No. 61/398,796 filed Jul. 1, 2010.

The present invention is directed to an improved manner in which to provide alerts or messages to a plurality of clients or workstations from a central server. The improvements are directed to manners in which to improve the performance of legacy systems that use a conventional polling architecture. For example, a legacy system for which the present system provides improvements has been developed by Desktop Alert, Inc. of Washington, D.C. which uses an IP-Based alert technology that can be integrated with enterprise-class environments. The Desktop Alert system shares communications and commands using standardized protocols such as XML and HTML. It is a multi-media, GIS enabled mass notification platform that is used to deliver messages and media including live surveillance video, images, audio files, giant voice, interactive Flash files and other applications to desktops as well as other devices such as telephones, cell phones, e-mail and mobile devices. The Desktop Alert system allows transmission of such messages to a plurality of clients or communication devices and generally has the following features and capabilities:

A Distributed Architecture for Wide Deployments;
Silent unattended client application installation to all workstations;
Enterprise-wide alert publication capability;
Automatic fail over redundancy;
Roaming user detection;
Role assignment not limited to Sign On credentials;
Priority Alert Functionality;
Operates behind SSL certificate and can support upwards of 2048 bit message encryption;
On-the-fly group creation as well as Active Directory group structure integration/adherence;
Administration, Moderator and end-user controlled access to the interface;
Embedded web-based html editor for easy yet elegant alert creation using HTML and Custom scripts;
Built-in Windows client and web interface authentication;
Audit trails for all published alerts;
Template creation for re-usage;
Calendar launch of predefined alerts, alert expiration dates;
Desktop Alert integrates with existing IVR/PBX telephony systems and existing PA systems;
Send Alerts to Desktops, e-mails, cell phones and telephones, all with one command
Unlimited number of end-users on any domain/base;
Allows for pre-programmed alerts which are sent based upon preexisting scenario triggers sent by existing 3rd party enterprise applications;
Create, preview and schedule alerts in advance (html enabled);
See subscribers who are online including the subscribers group identification;
See subscribers who did or did not receive and read alerts;
Send alerts that open with "upper most screen" functionality. If a user has multiple applications open, the alert will take the fore screen and stay open until engaged;
Customizable user interface;
Leverage comprehensive reporting and unique empirical data;
Activity is logged and available via a web-based interface;
Can be used as an e-mail supplement or alternative communication system for when email servers are down;
Content delivery may be delivered to a select audience or client group;
Scheduled content delivery at a time the user designates;
Delete/Cancel scheduled alerts;
Alerts may be created by the user from pre-defined and customized alert templates for rapid alert publication;
Flash, Video, Sound may be provided within the alert message by copying the html into the message.

Alert notification systems are particularly useful in connection with military installations, schools, business and government agencies and other groups that operate on networks and allow the operator or central command and control to timely provide information to a plurality of users or subscribers including critical emergency information or other news alerts. The communication can be directed to predetermined subsets of users that subscribe to the alert notification system.

Desktop Alert's Enterprise Level Mass Notification Platform provides a unified messaging platform for its message system and includes a feature rich web-based interface for instant mass alert publication to targeted personnel and devices. The alert systems may be a premise-based solution that is hosted by the purchaser of the system behind a firewall. In an alternative embodiment, the system can be provided as a software as a service (SAAS) over the web. Desktop Alert's commercially available system can integrate with directory services such as Active Directory, enterprise applications and appliances via web services. The system can be integrated with existing intelligence and business rules of the client. The architectural topology and sharing technology design is such that disparate systems across multiple networks can easily engage and interact with the Desktop Alert Mass Notification System. This is accomplished through the usage of Web Services Description Language (WSDL).

DETAILED DESCRIPTION OF THE INVENTION

The present invention is an improvement to message systems wherein a plurality of clients are in communication with a server through a network that use a polling model, in contrast with systems that use a push model. The basic concept behind polling models is that the client periodically provides queries to the host or server requesting updated messaging information. Polling models are commonly used for checking email and for other applications that require the timely updating of information such as stock prices and weather.

Figure 1:
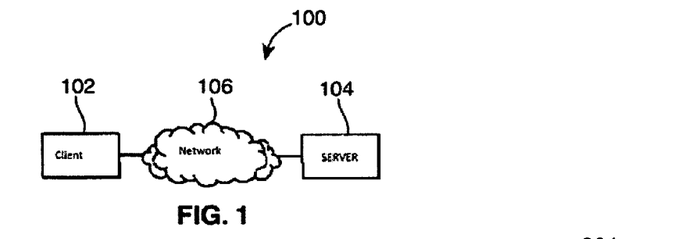
FIG. 1 is a schematic representation of a client in communication with a server in accordance with the invention over a network.

As depicted in FIG. 1 electronic communication on a web service network often includes a client computer system (hereafter referred to as a "client") requesting access to a network service (e.g., web services) at a server computer system (hereinafter referred to as a "server," "service," or "web service"). Accordingly, the client sends a request to the service for particular access to its system resources over a network, wherein the service replies with a response message providing the desired information. Of course, other messaging patterns between client and service may be available and include simple singleton messages as well as more sophisticated multi-message exchanges like, e.g., notifications, solicit-response, pub-sub patterns, polling, kick-push, queuing, and others. In addition, there may be other procedures needed for accessing the service resources, such as authentication and validation mechanisms.

The system of the invention therefore includes a client and a server that communicate over a network such as that illustrated in FIG. 1. The server is designed to provide a digital notification in the form of instant messages to clients which are users or groups of users having at least one communication device such as a desktop computer, a wireless computer, a smart phone, or other wireless device having an internet connection. The server, which may be operated over the interne or behind a firewall, can store information relating to the various users that poll the server. The server is also associated with a database which may be as SQL™, MySQL™, Oracle™ or another industry standard database. The database may also include additional user contact data for groups of users and user selected priority information relating to additional manners in which the user may be contacted.

An administrator at the sever location may enter new alert messages by data entry through an administrator interface and thereby make them available to the clients at the server. The alert messages will include data reflecting those clients or groups of clients to which the messages are intended to be communicated. In addition to making the message available to the clients that poll the server for alerts, the server may also communicate the alert message though alternative techniques.

The server may communicate with the client using a local area network, a wide area network, a virtual private network, an asynchronous transfer mode network, a synchronous optical network, a wireless network, a WIFI network, a WiMax network or combinations thereof. The administrator that enters the alert message into the server may be a person, a computer, another digital notification and response system, an analog emergency notification system, a mass notification system, an application programming interface, and combinations thereof. The alert message is a prewritten or prerecorded message stored in the dynamic information database for subsequent use by the administrator In an exemplary system using a polling model, in response to a request for message alerts, an alert is transmitted to the client in instant message format that opens a window on the display panel at the client station. As for scalability, the load placed on a server with each client that is polling every few seconds needs to be taken into consideration. Depending on an application's needs, the frequency of requests could be reduced, or even made dynamic so it polls less frequently if it receives fewer messages and increases the frequency if larger sets of messages are received. Since HTTP GET is used for the method call, the size of the data sent to the method is also restricted. The response to a remote method call has no explicit restrictions on size, but if large amounts of data per request are being passed to or from the server, this messaging architecture may be problematic. While polling architectures have been widely adopted, as the scaling increases, the performance of the system may be adversely affected.

The following data may be tracked and determined in existing polling based systems: Requests/sec=Number of clients*polling frequency. For example: 83 requests/sec for 5000 clients polling once per minute (1/60). Conversely, the polling frequency can be set by knowing the number of expected clients and the available performance (potential requests/second) of the selected hardware.

One manner to improve the performance of a network is to reduce the database usage. A database can only achieve so many read/writes in a given time period. By reducing the number of read/writes for any given operation, the potential to perform more of those operations in a given unit of time or to perform additional other operations is increased. In other words, most applications are I/O bound. Because the assumed database use often is not the actual database use, the database use should be repeatedly measured to determine if theorized results are actualized. Another further manner to achieve better performance disclosed herein is achieved by caching data closer to the end point (user).

In an example, a test client that could simulate n user connections was created. More specifically, a set of clients each calling the Desktop Alert web service GetUnreadAlerts call was established. The GetUnreadAlerts is the call initiated by the client to the server and is communicated to the server at the polling frequency. The GetUnreadAlerts is a SOAP call which is discussed further below. Once the test client is put into operation, the code behind the critical GetUnreadAlerts call and the resulting database calls or usage in the conventional polling system, such as the Desktop Alert system may be evaluated.

In the Desktop Alert system, each call to GetUnreadAlerts results in:

1 database db.GetUser call
1 db.GetAccount call, and
1 db.GetUnreadUserAlerts call.

The applicant has found that the "db.GetUser" and "db.GetAccount" calls could be cached in the web server process's memory (for a period of time), which avoids unnecessary repeated calls to the database. If no new alerts are entered into the system between same-client GetUnreadAlert calls, nothing has to be done. As a consequence, the logic in GetUnreadAlerts call may be "short-circuited" and improved. To take advantage of this improved call structure, first a database caching class was added to the server as further described below and then implemented caching both the "db.GetUser" and "db.GetAccount" calls. It should be understood that cached database objects are subject to a specific timeout value.

Next, a global table (in-memory) was added that maps each requesting userId to the last system-wide alertId at the time of the last GetUnreadAlerts call. If the system-wide alertId changes (measured in increments), then and only then, does the db.GetUnreadUserAlerts database call get made for that user. This in effect provides a "short-circuit" or "short-cut" test for each poll request. As the client polls the server it requests the value of the alertID changes. The client then compares the value of the alertID change with the value stored in its memory. If the value is greater than zero, or if the alertID value has increased since the client last polled the server, the client then requests the unread alerts that are specific to the user. In summary, instead of the client asking if the server has any new alerts for the particular client, the client asks if there are any new alerts in the entire system since the client last called the server. If there exists a new alert message in the system, the server will send a message to the client that there are new alerts and the client will then transmit the GetUnreadAlerts as was performed in the prior art system.

Since the number of poll requests from the clients vastly outnumbers the number of new alerts that are posted in the server in any given day, this technique saves considerable processing time.

Test Configuration

Tests were conducted on two machines to compare the new feature to an existing system. A first machine or system, "Machine 1," is established to run the Desktop Alert web application/service+SQL Server. A second machine or system, "Machine 2", is established to run the improved test client.

The test client is a single application that can run n threads against a target server. Each thread does essentially the same task: repeated calls to the Desktop Alert web service GetUnreadAlerts call. The database was configured with 10,000 users (username user1, user2, . . . usern), all with the same password. Each test thread randomly chooses among the available users for each call.

The test client fully engaged the server. At 500 threads the server, with back to back calls, reached its maximum performance. For instance, if 700 threads were applied the server would slow down due to request saturation.

Shown below in Table 1 is a summary of the results. The results provide data for the following parameters:

Requests/Second: The number of requests per second of a roundtrip request/response to the web service. The higher the better (we are trying to achieve maximum call throughput).

Database Transactions/Second: The database activity in calls per second. The lower the better (we are trying to limit the use of the database).

Limit (row 3) established the limit using Machine 1 and Machine 2. The Limit test (aka HelloWorld Web Service test) makes a simple web service request to the server and receives the string response "Hello World." At 1,260 requests/second, this essentially establishes the upper limit (on this hardware) of the potential throughput.

Existing GetUnreadAlerts: A maximum of 215 calls per second were recorded, resulting in an average of 756 database calls per second.

Improved GetUnreadAlerts: A maximum of 709 requests per second were recorded, resulting in an average of 3 database calls per second. This is an approximate 330% improvement in request throughput and results in a significant decrease in database use.

TABLE 1

Summary of Improved performance

| Process | Requests/Second | Database Transactions/Second Required |
|---|---|---|
| Existing GetUnreadAlerts | 215 | 756 |
| Improved GetUnreadAlerts | 709 | 3 |
| Limit | 1260 | n/a |

System Performance in a Prior Art System

Figure 2:
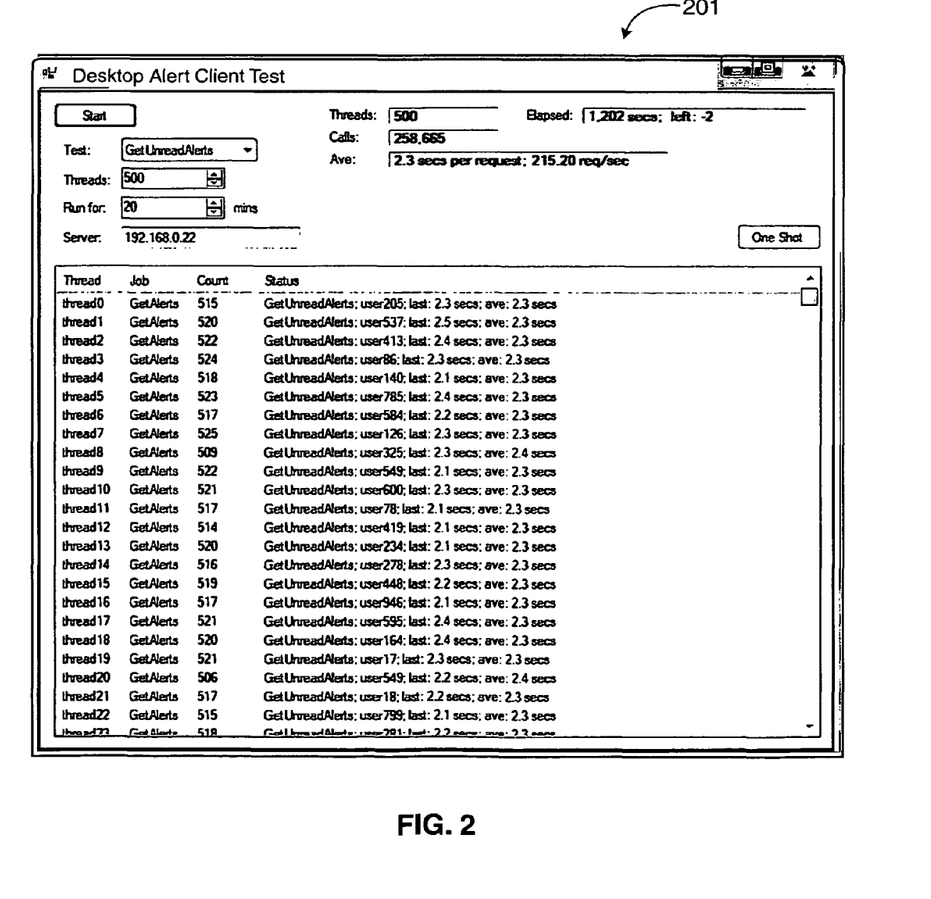
FIG. 2 is a screen shot of a display depicting the test client throughput data before the improvements have been applied to the invention.
Figure 3:
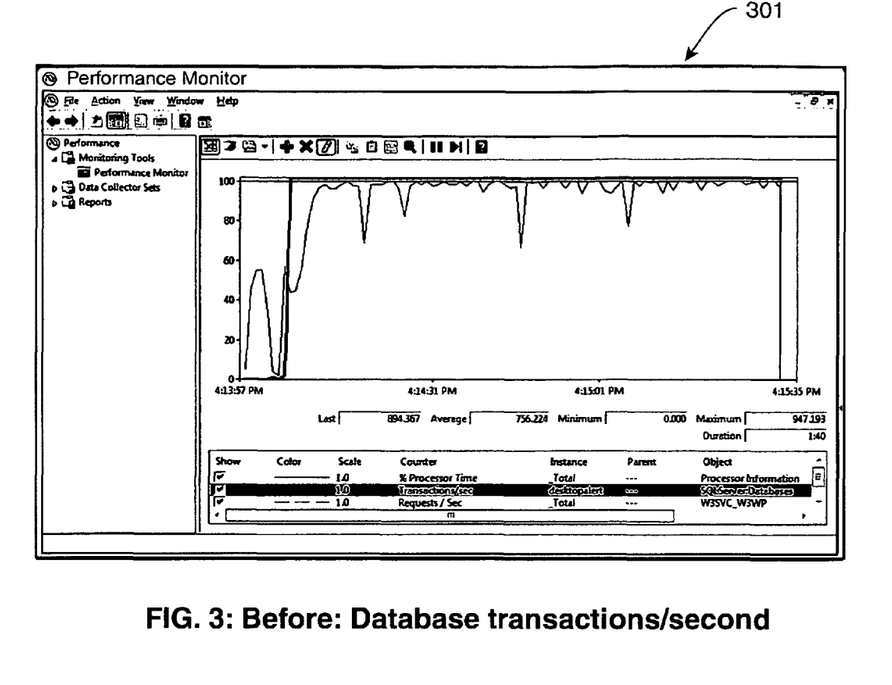
FIG. 3 is a screen shot of a display depicting the processor activity on a prior art system before the improvements have been applied.

As illustrated in FIG. 2, screen display 201 depicts a the test client throughput is running 500 threads that repeatedly call the Desktop Alert web service GetUnreadAlerts is evaluated. The data in FIG. 2 reflects approximately 215 requests/second, resulting in 258,665 calls in a 20 minute test period FIG. 3 shows the number of database transactions/second before the improvement disclosed herein was implemented. Referring to screen shot 301, since each web service call makes 4 database calls, the average of 756 calls/sec (~215*4) is the logical calculated result. The black bar graphs the database usage from test start across a 1 minute 40 second window. Note that the black bar rises steeply and never falls; the database remains busy.

System Performance After Improvements Implemented

Figure 4:
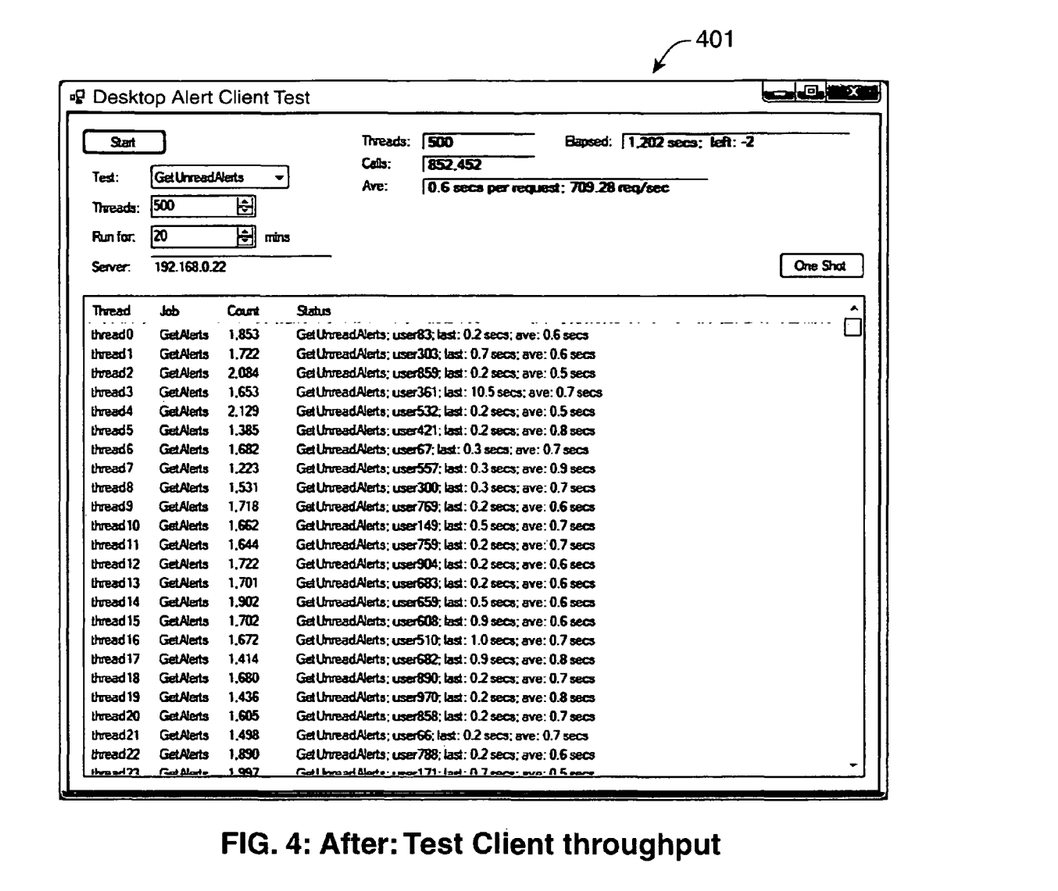
FIG. 4 is a screen shot of a display depicting data reflecting the throughput after the improvements according to the invention disclosed herein have been applied to the test system.

Now referring to FIG. 4, the screen depiction 401 of a screen of a test client, running 500 threads that repeatedly call the Desktop Alert web service was analyzed after the protocols according to the invention were implemented and the following data was collected relating to the GetUnreadAlerts. The data depicted in FIG. 4 reflects 709 requests/second, resulting in 852,452 calls in a 20 minute test period.

Figure 5:
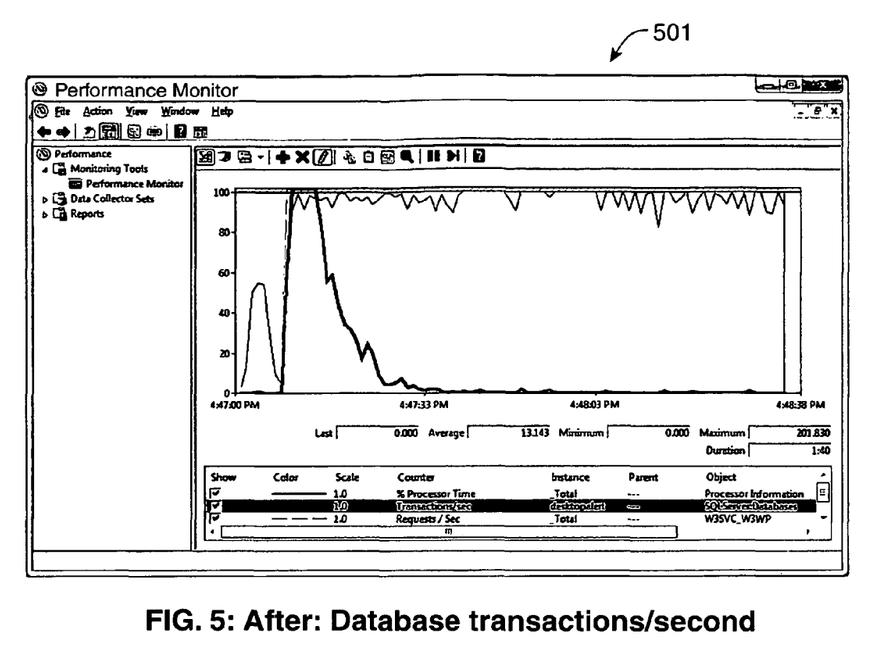
FIG. 5 is a screen shot of a display depicting the processor activity on a prior art system after the improvements have been applied.
Figure 6:
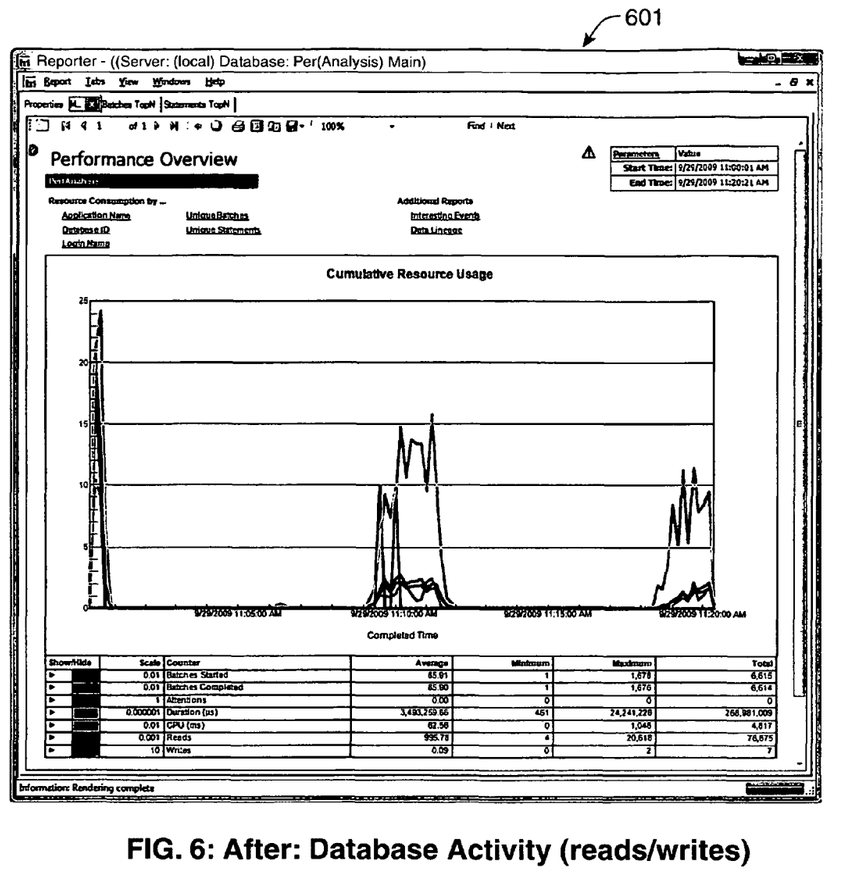
FIG. 6 is a screen shot of a display depicting the performance of the database activity of the test system.

FIG. 5 shows a screen shot 501 that reflects the number of database transactions/second after the implementation of the improved protocols. The black bar (transactions/second) rises steeply at first, but as in-memory caching takes over, the bar drops dramatically. In this window of time (1 minute, 40 seconds) the average falls to 13 transactions/second, though over the entire period of 20 minutes the average falls to approximately 3 transactions/second. FIG. 6 is a screen shot of a display depicting the performance of the database activity of the test system.

The following section describes how the database is used for the critical GetUnreadAlerts web services calls. As the system starts, all clients tax the database at the extreme, as no database calls are cached in-memory (this use approximates the existing prior art model), but as database calls are cached, database use drops sharply. These cached results eventually expire (using a set timeout), and as they do, the database will be called to refresh the results. For the db.GetUser call a period of 10 minutes+−1 minute for a cache timeout was selected.

In addition, when a new alert is entered by a user, a flurry of database activity occurs, resulting in 1 db.GetUnreadUserAlerts call per user. This is because the global alertId is incremented, indicating that each client must go to the database to check if new alerts are available. After this check no calls to db.GetUnreadUserAlerts occur until another new alert is entered.

Summary of Results of System Using Enhanced Initial Call Logic

As demonstrated by Table 2, the improvements to the system and method greatly improve the polling performance of the previously available Desktop Alert notification system. It is estimated that the present system results in 300% improvement in comparison with the prior art system while at the same time vastly reducing the database use.

TABLE 2

| Process | Requests/Second | Database Transactions/Second Required |
|---|---|---|
| Existing GetUnreadAlerts | 215 | 756 |
| Improved GetUnreadAlerts | 709 | 3 |
| Limit | 1260 | n/a |

These changes are server-side only, the client is unaffected.

System-Wide Performance Implications provided by the Improved System

The improvements disclosed above result in significant improvements to the performance of the system. As the example demonstrates, by altering the logic so that the system will seek to obtain new alerts only when the system has created new alerts, the polling frequency may be increased from 215 requests/second to 709 requests/second while dramatically reducing database usage. This improvement allows a installation to drop the polling interval by a factor of 3 without the requirement of any hardware changes. In other words, if the polling interval of a system is at 60 seconds, the present improvement allows the polling interval to be set at 20 seconds without effecting performance. Even if one were to a follow a very conservative approach the present improvement easily allows one to double the polling interval. Consequently, the speed in which messages are communicated to the users is increased.

Furthermore, since the database use model has changed dramatically, the database is no longer the limiting factor—it's the potential throughput of the GetUnreadAlerts web services calls. A given box can only manage so many calls a second—dispatching the call through the web server on the Windows platform to the web service, authenticating the request, and running the code behind GetUnreadAlerts. As discussed above, the maximum achievable call throughput in the test box was 1,260 requests/second—this limit cannot be improved on the existing hardware no matter what changes are made. But this means that more than one front-end web server coupled with a back-end database can dramatically improve overall the performance (or polling interval).

It follows that if 709 requests/second can be achieved on one box, 2 boxes (with our new found database headroom) can manage 2×709 requests/second, and so on. The practical reality is this: when a box is stressed with a high-frequency polling of GetUnreadAlerts, it becomes rather unusable for other tasks—namely web application calls of the Desktop Alert web application.

A first contemplated system configuration includes 1 database box, n front-end web service only boxes, 1 web application box. This system includes a single box dedicated to web-service, web-application, and database.

A second contemplated system depicts n general purpose (web-service+web-application) front-end boxes and 1 dedicated database box. This system requires either WLBS (windows load-balancing service) or a round-robin DNS.

A third example as contemplates a single web-application front-end, n web-service front-ends, and 1 dedicated database box.

Reduction of the Communications Payload

As discussed above, altering the logic of the polling model is a first manner in which to increase the performance of a system using an alert notification system by reducing the demands on the database. While the contemplated deployments may allow a dramatic increase the polling frequency and scale (number of clients) of the system, other problems become evident: the amount of network data associated with the GetUnreadAlert SOAP calls starts to rise (and gets noticed). Ultimately, the polling frequency cannot be decreased while at the same time going for scale because the two concepts are opposed.

Figure 7:
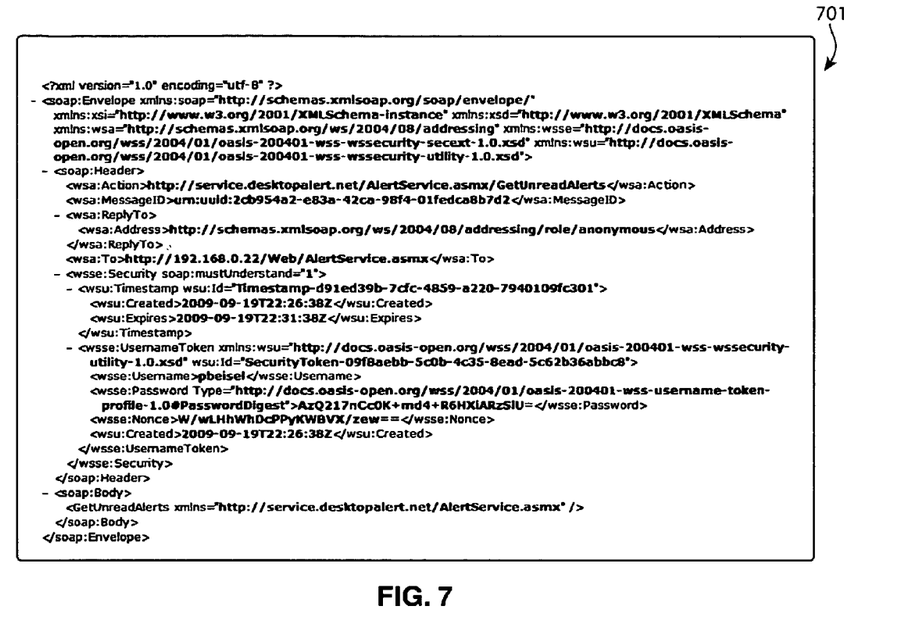
FIG. 7 is a screen shot of a display depicting the SOAP request from the client.
Figure 14:
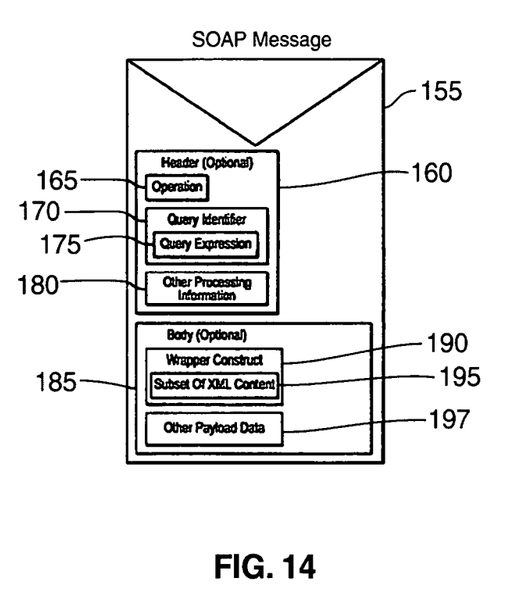
FIG. 14 is a schematic representation of a SOAP message.

SOAP is relatively heavy-weight protocol with an unfortunate amount of overhead. In general, SOAP is an XML-based messaging protocol. It defines a set of rules for structuring messages that can be used for simple one-way messaging but is particularly useful for performing RPC-style (Remote Procedure Call or Remote) request-response dialogues. It is not tied to any particular transport protocol nor any particular operating system or programming language so theoretically the clients and servers in these dialogues can be running on any platform and written in any language as long as they can formulate and understand SOAP messages. As such SOAP can be used as a building block for developing distributed applications that exploit functionality published as services over an intranet or the Internet. SOAP messages must be parsed, interpreted and checked for compliance with security protocols. The overhead associated with an "empty" call (no returned new alerts for GetUnreadAlerts) is larger than the payload by far (and this is the most frequent call). Increasing the polling interval only increases the number of these calls, thereby flooding the network. FIG. 7 shows the request side of the GetUnreadAlerts call, this is 1,672 bytes in length, the "empty" return data is larger (though not appreciably). The optimization, discussed herein, can limit this from 1,672×2 per request to about 20×2 per request. Referring now to FIG. 14, a SOAP message is schematically represented and includes header 160, operation 165, Queiry Idetifier 170, Query expression 175, and other processing information 180. The Body 185 of the SOAP message includes the Wrapper construct 190, subset of OML content 195 and other payload data 197.

Figure 8:
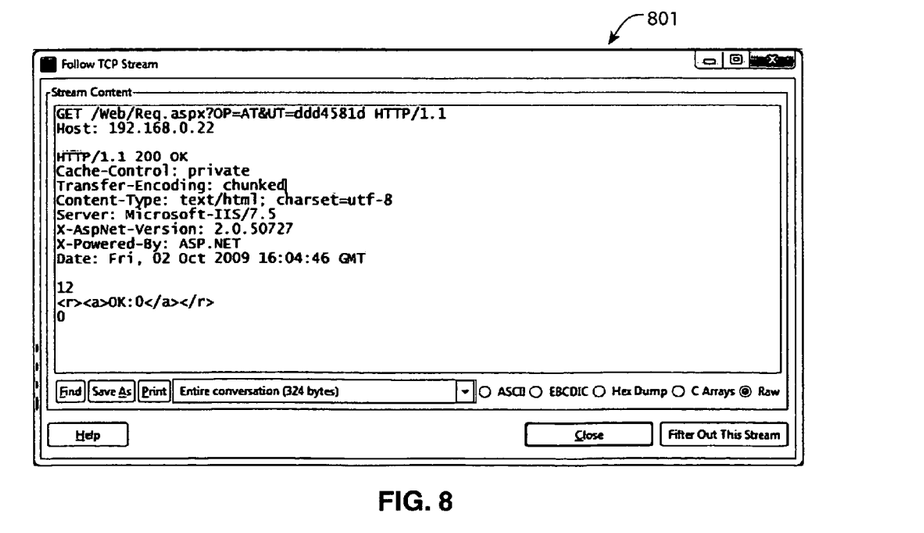
FIG. 8 is a screen shot of a display depicting the improved Req.aspx call and response messages.

An additional manner in which to improve performance to a polling based system such as the Desktop Alert system is to change the client-server protocol to use a format other than SOAP for the "triggering" GetUnreadAlerts call. In this alternative model, GetUnreadAlerts call remains intact but is not used for polling, rather a new polling call IsNewAlerts is added. This call passes the userId in a tight HTTP packet (not SOAP) to the web-server, approximately 20 bytes of payload. The result of this call is simply a Boolean value: true or false. If true is returned the client makes the formal (and existing) GetUnreadAlerts calls. IsNewAlerts does not require authentication and therefore can bypass the SOAP security layer. FIG. 7 depicts the client request data for GetUnreadAlerts from the server using the SOAP protocol. In contrast referring now to FIG. 8 is a screen shot 801 of a display depicting the improved Req.aspx call using the HTTP GET protocol and response messages is depicted which has a smaller communications and data payload.

Accordingly, a further aspect of the invention is therefore directed to a manner in which to reduce the necessary length of the communication from the client to the servers which results in increased efficiency of the system and a decrease on the load placed on the servers and database thereby improving performance and allowing for an increased number of users or clients that may be maintained by a particular server. While the message is reduced, the security of the system remains intact.

In an embodiment the message from the client to the server is a SOAP call, which refers to as Simple Object Access Protocol, which refers to a protocol for exchanging structured information in the implementation of web services in computer networks. The communication relies on Extensible Markup Language (XML) as its message format, and usually relies on other application layer protocols such as Remote Procedure Call (RPC) and HTTP for message negotiation and transmission. SOAP can form the foundation layer of a web services protocol stack, providing a basic messaging framework upon which web services can be built.

The key features of RPC are a request-reply protocol, and can exhibit the "ping-pong" behavior typical of such protocols. This exchange is not fundamental to RPC's design, since multiple requests can be outstanding, and the replys can be received in any order. However, some programs will issue a single RPC request, and then block awaiting a reply. RPC operates over UDP or TCP. RPC/UDP is a connection-less, stateless protocol. RPC/TCP is slower, but provides a reliable, stateful connection. RPC encodes its data using the eXternal Data Representation (XDR) protocol, documented in RFC 1832 standard which standardizes the format of integers, floating point numbers, and strings, and thereby permitting different types of computers to enhance information seamlessly. RPC provides support for authenticating the calling program on one machine to the target subroutine on the other. This authentication can operate in several different modes. During operations, authentication usually takes the form of relaying UNIX user and group IDs to the file server for permission checking.

A SOAP message can be sent to a web service enabled web site or server with the parameters needed for a data search. The site then can return an XML-formatted message with the resulting data. Because the data is returned in a standardized machine-parseable format, it can be integrated directly into a third-party site. The SOAP architecture consists of several layers of specifications for message format, message exchange patterns (MEP), underlying transport protocol bindings, message processing models, and protocol extensibility. SOAP is the successor of XML-RPC, though it borrows its transport and interaction neutrality and the envelope/header/body from elsewhere.

As a SOAP call with envelope security, the request and response are "fat" or large in terms of the number of bytes transmitted. As discussed above, in the prior art Desktop Alert system a typical request from the client averages 1,670 bytes of SOAP payload. This payload does not include the HTTP, TCP, or IP header which amounts to another 400 bytes (approximately). The "empty" response from the server, or a response without any substantive content, averages 1,450 bytes of SOAP payload, with 350 bytes of HTTP/TCP header (approximately).

TABLE 3

| Call | SOAP Payload | HTTP + TCP/IP header | Total |
|---|---|---|---|
| GetUnreadAlerts Request | 1,670 | 400 | 2,070 |
| GetUnreadAlerts Response | 1,450 | 350 | 1,800 |
| | | | 3,870 |

As demonstrated in Table 3 above, a request/response pair that delivers no alerts has a network cost of 3,870 bytes on average. Worse, each side (the request and the response) falls over the Ethernet MTU threshold of 1,500 bytes. Consequently the request, as well as the response, must be transmitted in 2 packets each. Because two packets are required, the transmission introduces the potential for latency/retransmits which is not preferred. In addition, this payload is periodically sent by each client in the subscription network. As an example, if there are 5,000 connected clients in a 24 hour period, polling once per minute, the resulting network traffic is 27.8 GB per day. If the polling frequency is increased, the daily network traffic is commensurately increased.

Additionally, the SOAP processing of large XML packets is processor intensive. Both the initial parsing by XMLDocument (the core XML component on Windows) and then the SOAP security processing is a heavy lift for the server.

The Improved Communications Protocol

In response to these issues, the present invention includes a new core polling call that avoids SOAP. Rather, the transmission from the client is a simple HTTP GET request (e.g., http://server.domain.com/Req.aspx?OP=AT&UT=ddd451af) and returns a HTTP response with a simple XML result. According to the improved system, Req.aspx replaces GetUnreadAlerts as the polling call, but GetUnreadAlerts remains intact. Importantly, the system preserves the GetUnreadAlerts protocol and it can be called as before, ensuring 100% backwards compatibility (existing clients can connect unchanged).

The improved protocol is simple, employs a lighter payload, and is secure. According to the new system, the client starts with the GetUnreadAlerts SOAP request as has been used in prior art systems. On a protocol 2 enhanced Desktop Alert server, two pieces of additional information are returned from the server in the GetUnreadAlerts call: (1) a protocol number and (2) a temporary user token.

The protocol number, set to a value of 2, specifies the protocols available between client and server. The value of 2 indicates that protocol level 2 is available and refers to the method disclosed herein. An existing client of course will not test this value and therefore only know to poll through GetUnreadAlerts (which continues to work as before). A new client, seeing this value, can switch to the new protocol.

The temporary token is a value, temporary in nature, which is used in subsequent Req.aspx calls. The token is established on the server through the initial GetUnreadAlerts call, which is an authenticated SOAP call. The temporary token can become invalid, in which case a result is returned through Req.aspx that indicates the client must call GetUnreadAlerts to get a new token. The purpose of the temporary token is discussed below.

Next, the client calls Req.aspx with two parameters: OP and UT. Req.aspx is meant to be a general purpose call and may be extended in the future, but for our purposes OP is set to AT (meaning "alert test"). UT is the temporary user token supplied by the GetUnreadAlerts call. The client will receive a small XML result from Req.aspx. For OP=AT, the possible results are set forth in Table 4 as follows:

TABLE 4

| Result | Meaning | Action |
|---|---|---|
| <r><a>OK:0</a></r> | Call OK, 0 new alerts | Schedule another call to Req.aspx at next poll interval |
| <r><a>OK:n</a></r> Where n is a value > 0 | Call OK, n new alerts | Immediately call GetUnreadAlerts to gather alerts for display; Schedule another call to Req.aspx at next poll interval |
| <r><a>ERR:1</a></r> | Call ERROR, temporary token invalid | Immediately call GetUnreadAlerts to get a new token (gather any alerts for display); Schedule another call to Req.aspx at next poll interval with new token |

All calls to GetUnreadAlerts can provide a new temporary token and available alerts, the client should always assume this.

Now referring to FIG. 8, the improved Req.aspx call is light-weight in that it only contains approximately 90 bytes (as shown below at the first two lines beginning with GET/web/reg.aspx . . . ). The response is approximately 185 bytes (as shown in below at the lines beginning with "HTTP/1/1 200 OK . . . ").

When compared to the original method, 27.8 GB of network traffic per day, this new protocol is reduced to about 2 GB a day.

The Temporary Token Security Method

A temporary token value is generated and returned on the call to GetUnreadAlerts which serves as a security device. The caller must assume that the token value can change on every GetUnreadAlerts call, and therefore must acquire the most recent token on each call to GetUnreadAlerts. If the token becomes invalid prior to a GetUnreadAlerts call, where the client is normally polling via Req.aspx, Req.aspx will return a specific error (ERR:1) that indicates that the token is invalid. In this case, the client must simply call GetUnreadAlerts using the protocol according to the prior art SOAP system. The GetUnreadAlerts is an authenticated call and therefore is used to obtain the temporary security token.

In an embodiment, the token is generated on an initial call to GetUnreadAlerts and remains intact until the server is restarted (the value is kept in memory) or the user is pushed to another front-end server, in the case of a server farm. It is contemplated that the token can be invalidated more frequently, or on some other predetermined or random interval. However, if the token is invalidated, the client must access the server using the GetUnreadAlerts protocol to gather a new token. If the token is frequently altered, the server and system will require more processing as an increased amount of data is exchanged through the network. Generating a new token on each GetUnreadAlerts call is more practical, taking advantage of the call itself and thereby eliminating unnecessary calls.

The timeout phase must be carefully considered. The db.GetUser call does more than retrieve the user record it also updates the 'LastActivity' column for the online users function. So now the window of precision is not the set polling interval but rather 10 minutes or the set polling interval, whichever is longer. Also, as db.GetUser is now cached in memory (at least for the client GetUnreadAlerts call), a change to the user record will not be seen by the client for a maximum of 10 minutes. For example, if the user's password is changed in the opt-in model, a client can continue to access the system for a maximum of 10 minutes.

The db.GetUser call is not cached in general, but rather a db.GetUser_Cached call is provided (and right now used exclusively in the GetUnreadAlerts web services call) that attempts to use the cache (or failing that, retrieve from the database).

Caching adds some "uncertainty" to data access because the cached version might not be identical to the database version. However, considering its use, implications and advantages in the present system the technique provides an effective solution.

Additional Reports

Below are some additional reports that further characterize the database use in the before and after scenarios. Table 5 below is expanded to include database reads and writes. Each read or write is an 8K page, the smallest read/write unit for SQL Server. The number of rows in an 8K page varies based on the table definition (number of columns/size of those columns). The Read/writes are 8K blocks, the smallest "unit" SQL Server reads/writes.

TABLE 5

| Process | Requests/Second | Database Transactions/Second Required | Database Reads | Database Writes |
|---|---|---|---|---|
| Existing GetUnreadAlerts | 215 | 756 | 9.047,509 | 1,752 |
| Improved GetUnreadAlerts | 709 | 3 | 76,675 | 7 |
| Limit | 1260 | n/a | n/a | n/a |

Figure 9:
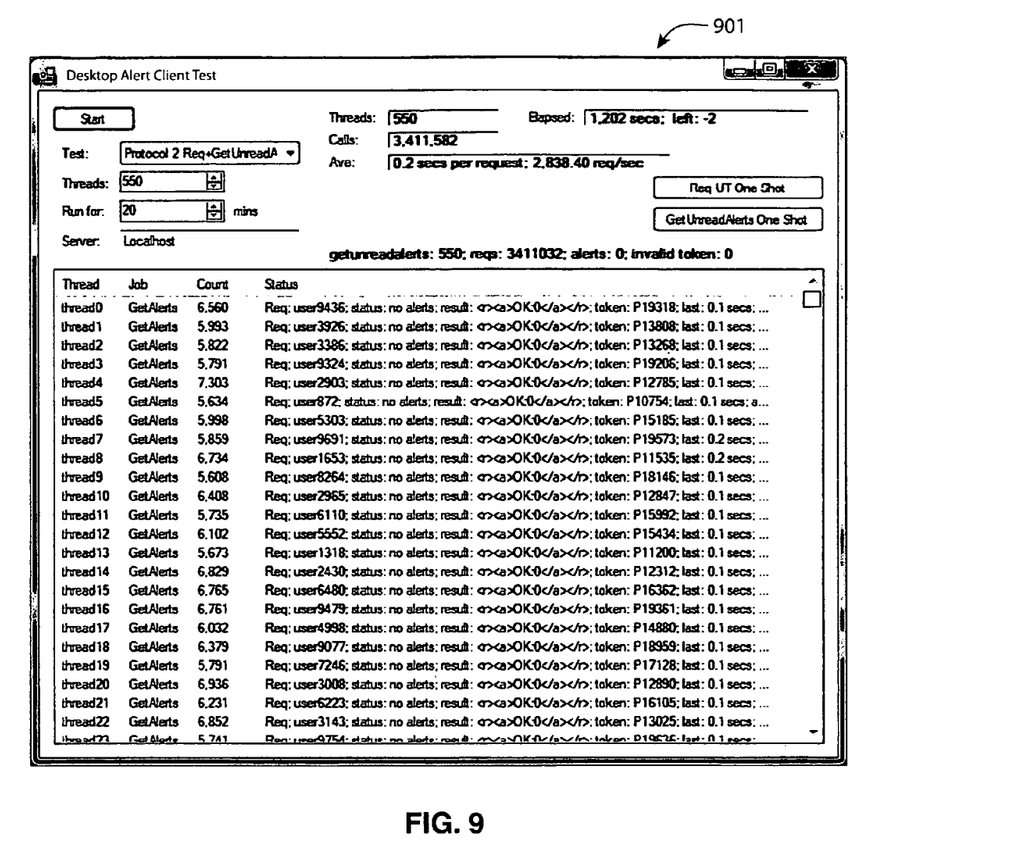
FIG. 9 is a screen shot of a display depicting data from a client test using the improved communications protocol.
Figure 10:
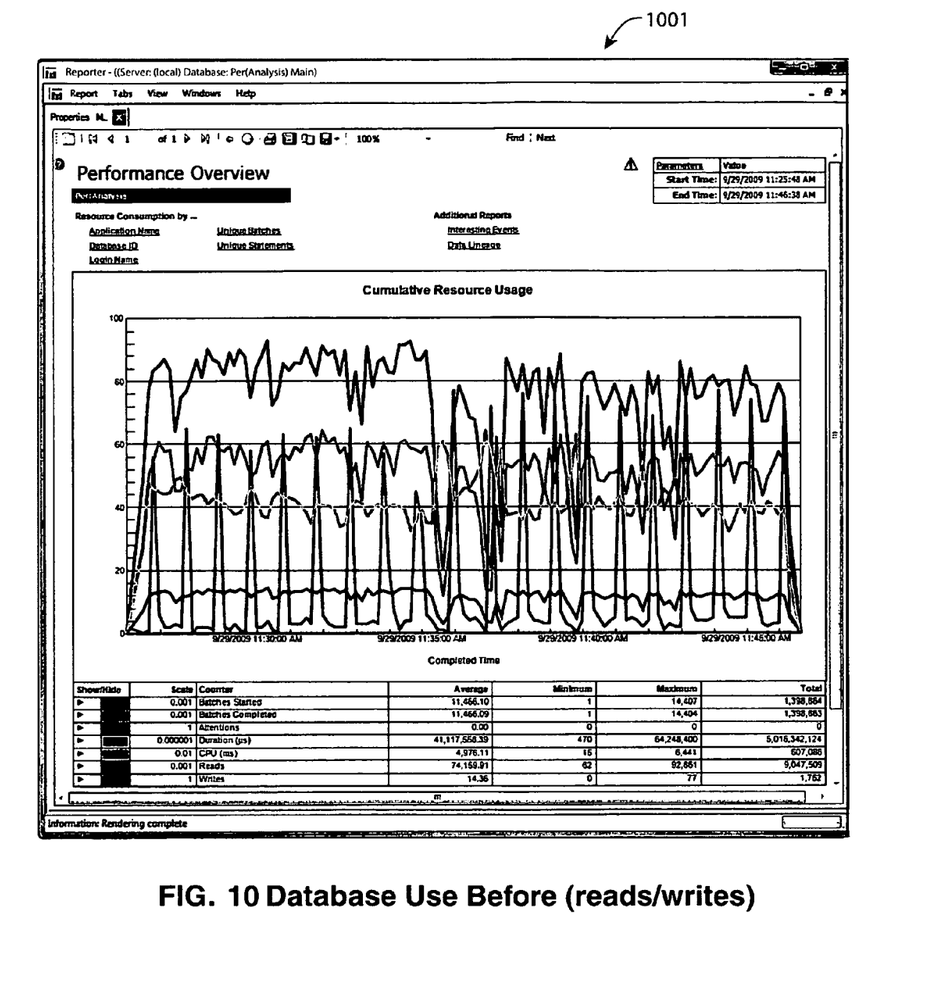
FIG. 10 is a screen shot of a display depicting Database Use and performance Before (reads/writes).
Figure 11:
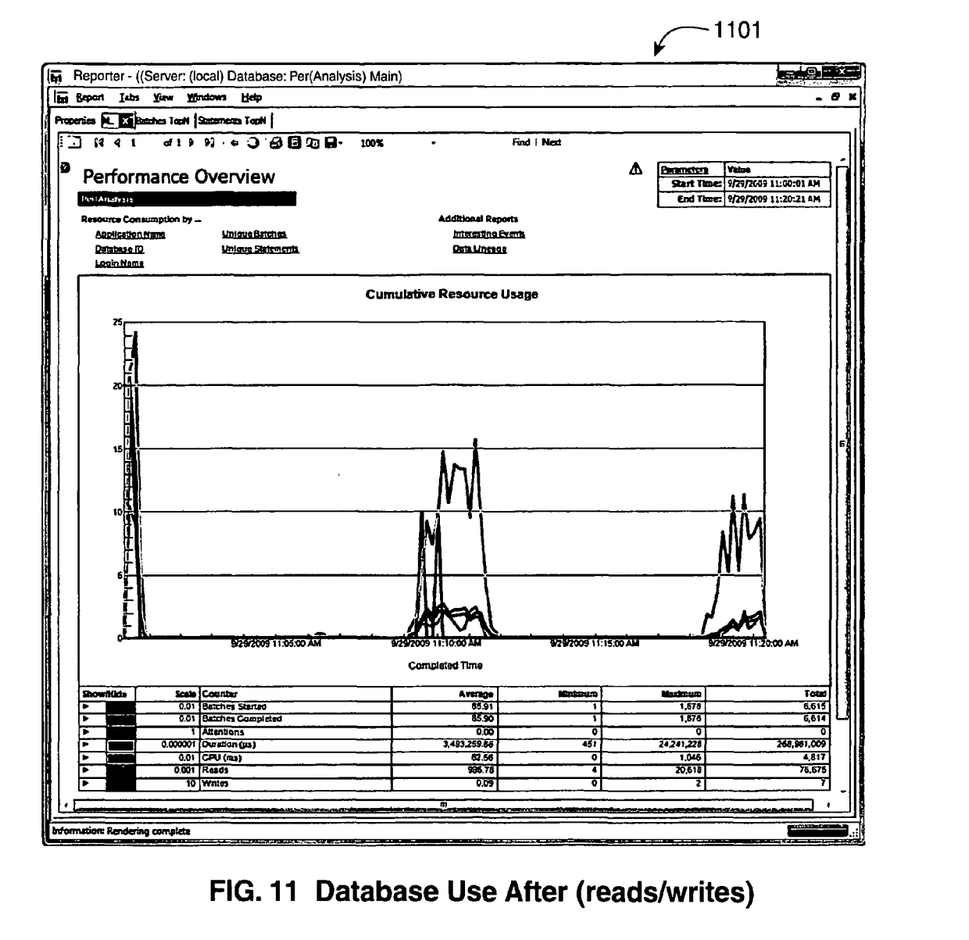
FIG. 11 is a screen shot of a display depicting Database Use and performance After (reads/writes).
Figure 12:
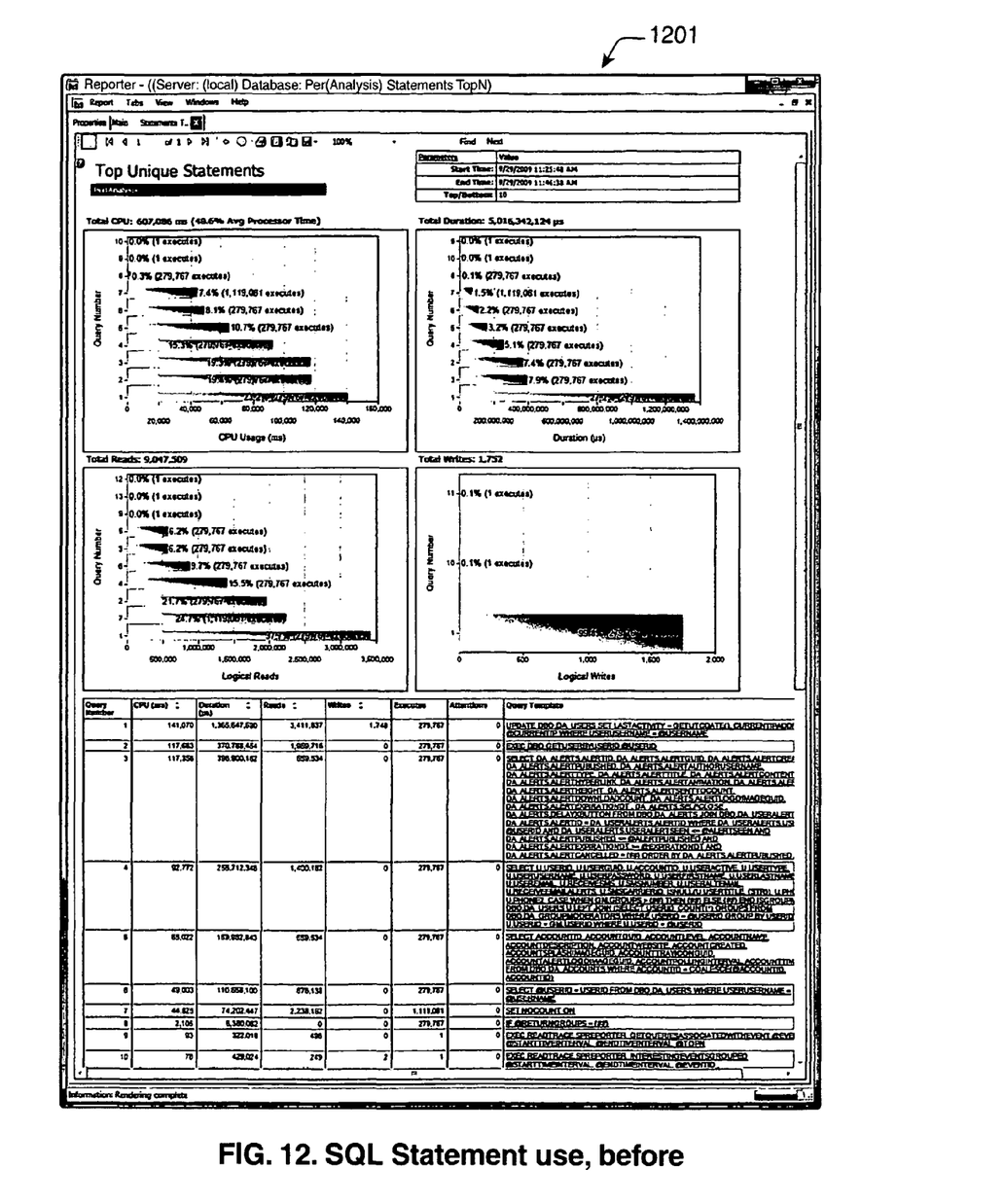
FIG. 12 is a screen shot of a display depicting SQL Statement use, before the improvements.
Figure 13:
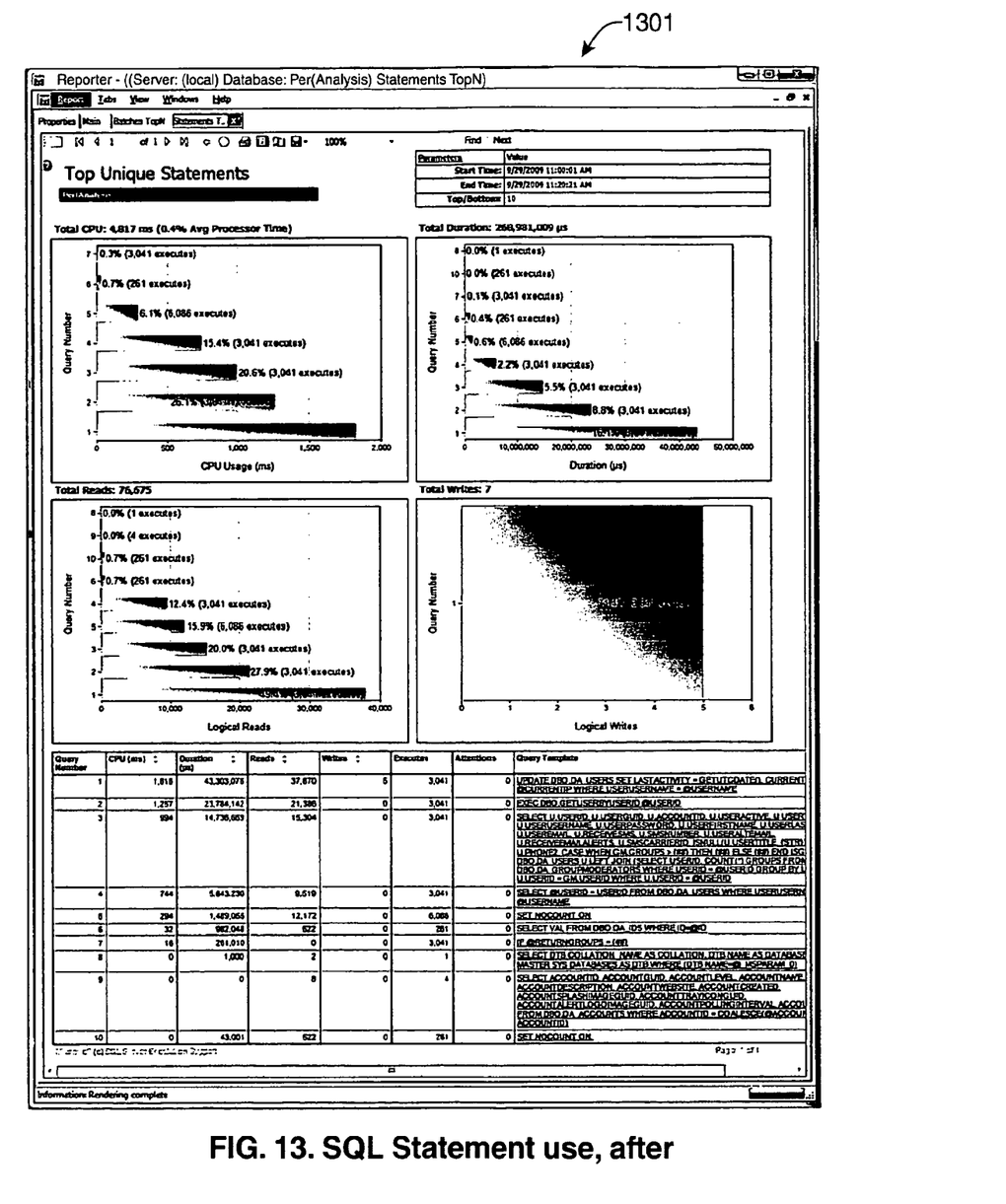
FIG. 13 is a screen shot of a display depicting SQL Statement use, after the improvements to the communications protocol have been applied to the test system.

FIG. 9 is a screen shot 901 of a display depicting a series data requests from a client test using the improved communications protocol using HTTP as described above. FIG. 10 is a screen shot 1010 of a display depicting Database Use and performance Before (reads/writes). FIG. 11 shows the database use before and after, respectively. In the after scenario as depicted at reference No. 1101, an initial spike 1103 and then two spikes 1105 around the 10 minute and 20 minute marks are depicted. These subsequent spikes occur because the cached data has expired and needs to be refreshed from the database. FIG. 12 reflects the performance analysis of the SQL as implemented on the system before the improved communications protocols using HTTP of the invention were implements and FIG. 13 reflects the performance after the improved communications protocol were implemented.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

I claim:

1. An improved method for the dissemination of an alert message to a plurality of personal computers using a network communications protocol, said computers comprising clients, each said clients subscribing to a central server, said server comprising an alert message cache, said server adapted to receive and store alert messages, and said server adapted to generate and store alert ID numbers, said method comprising, a first triggering step comprises the use of a HTTP packet comprising a request for a Boolean value relating to whether there are new alert messages and said packet comprises approximately 20 bytes, a second step wherein said client contacts the central server and requests the value of said alert ID number in said memory, said value reflecting the number of alert messages received by said central server, a third step wherein said server transmits said value to said client, a fourth step wherein said client compares a stored value at the client with the value of the transmitted alert ID number, and if said transmitted value exceeds said stored value, a fifth step wherein said client transmits a second message to said server and requests for the server to transmit all unread alert messages in a GetUnreadAlerts request from said server that are specific to said client, and if there are unread alert messages specific to said client in said server, a sixth step wherein said server sends to client all unread alert messages specific to the client, and, a further step wherein said client updates the stored value in its memory to reflect the number of additional unread alert messaged transmitted from said server to said client in response to said second message, and wherein, upon the reception of said unread alert messages in said sixth step, said alert messages are in instant message format and said client opens a window on a display panel to display said alert messages, wherein said communications protocol comprises protocols for the transmission of messages over the internet.

2. The method recited in claim 1 wherein said client will contact said server at predetermined polling frequencies.

3. The method recited in claim 1 wherein said communications between said clients and said servers uses a SOAP protocol.

4. The method recited in claim 1 wherein said first communications between said clients and said servers uses a HTTP protocol and said second message from said client requesting unread alerts uses a SOAP protocol.

5. The method recited in claim 4 wherein said first communications between said clients and said servers uses a HTTP GET protocol and said second message from said client requesting unread alerts uses a SOAP protocol.

6. The method recited in claim 1 wherein said communication proceeds according to an RPC protocol.

7. The method recited in claim 6 further comprises a RPC/UDP protocol.

8. The method recited in claim 6 further comprises a RPC/TCP protocol.

9. The method of claim 1, wherein said alert message comprises: the date the message was received by said server, a time the message was received by said server, a date the message was sent to said client, a time the message was sent to said client, content of the message and combinations thereof.

10. A system for providing alert messages to a plurality of clients using a polling-based network, said system comprising a plurality of clients, at least one server in communication with said clients using a network connection, said central server provided with input devices to receive alert messages, and a database, said database for storing said alert messages, and said processor having programming instructions to create and store an alert ID value corresponding to alert messages stored in said database, and said clients adapted to communicate with said server using an RPC communications protocol wherein said protocol further comprises a first triggering step comprises the use of a HTTP packet comprising a request for a Boolean value relating to whether there are new alert messages and said packet comprises approximately 20 bytes, and further communication from said client to said server requesting a Get Alert Messages using a SOAP communications protocol and wherein said client is transmitted an Alert ID message value from said server to said client, and if said Alert ID message value matches a stored message value, the client will further request from said server any alert messages to which it subscribes, and in response to said requests, said server transmits any unread alert messages and said unread alert message are in instant message format and upon the client's reception of said unread alert messages said client opens a window on a display panel at said client, and wherein said communications protocol comprises protocols for the transmission of messages over the internet.

11. The system of claim 10, wherein said server further comprising an application programming interface controls the administrator interface and provides at least one instruction to the administrator interface for creating said alert messages and transmitting said alert messages to the user contact devices.

12. The system of claim 10, further comprising display devices at said clients and at said server wherein said client displays, display said alter messages.

13. The system of claim 10, wherein said database is an SQL™ database, MySQL™ database, an Oracle™ database, another industry standard database, or combinations thereof.

* * * * *